Nov. 26, 1963 W. A. ERNST 3,111,743
METHOD OF MANUFACTURE OF A SEALED RESERVOIR BEARING
Original Filed Feb. 20, 1961
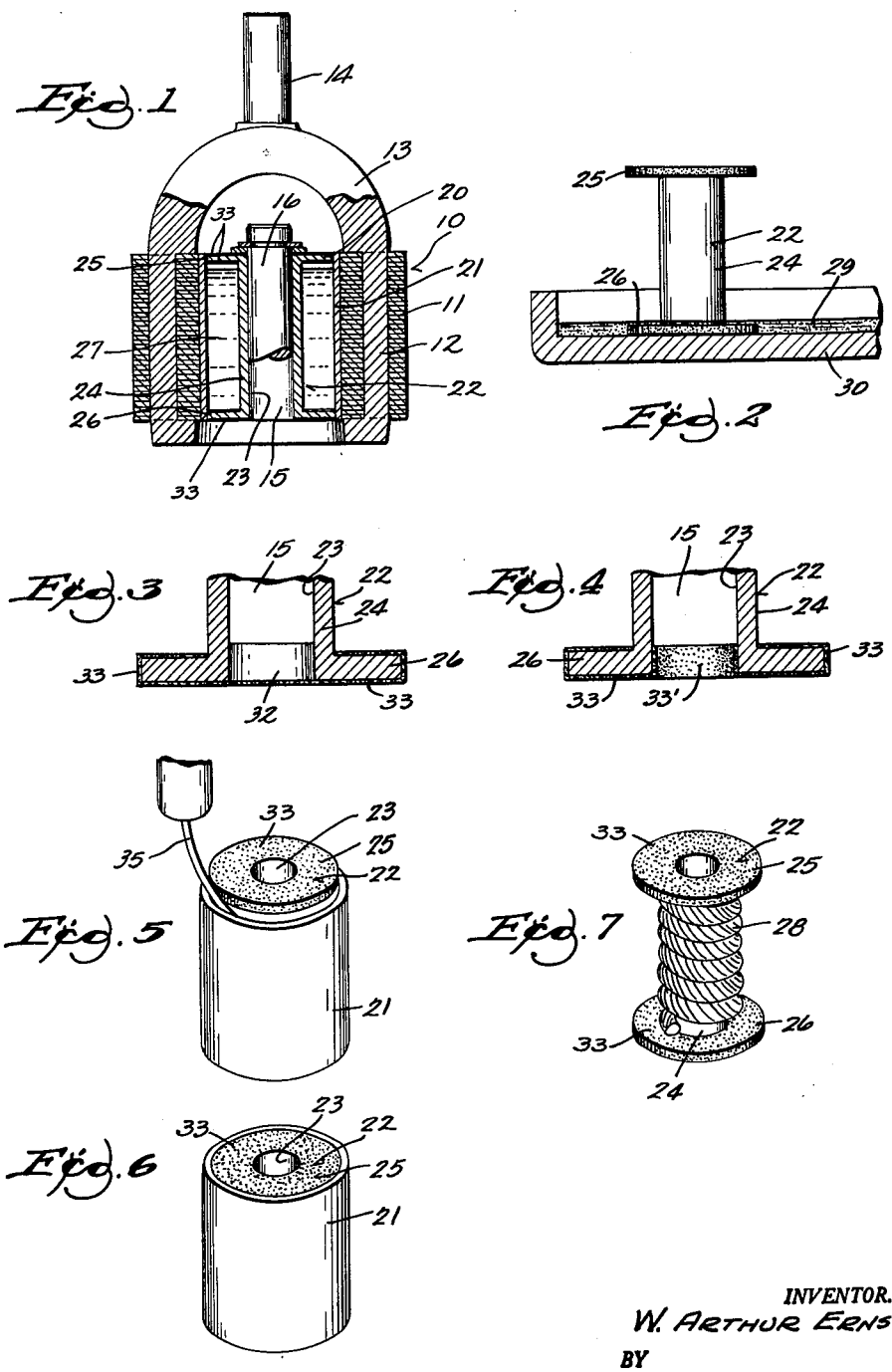

United States Patent Office 3,111,743
Patented Nov. 26, 1963

3,111,743
METHOD OF MANUFACTURE OF A SEALED
RESERVOIR BEARING
W. Arthur Ernst, 4601 Edgewater Drive, Racine, Wis.
Original application Feb. 20, 1961, Ser. No. 90,534. Divided and this application Dec. 22, 1961, Ser. No. 161,578
5 Claims. (Cl. 29—149.5)

This invention relates to a method of manufacture of a sealed reservoir bearing.

The present application is a division of application Serial No. 90,534 filed February 20, 1961.

The bearing comprises a porous spool-shaped member, whereof the inner periphery provides the bearing surface and the exterior is part of the reservoir. Lubricant is confined about the hub portion of the spool-shaped member between the heads thereof and by reason of the porosity of the hub the lubricant reaches the bearing surface.

The spool-shaped member is desirably made by a sintering operation. In consequence, its heads as well as its hub portions are porous. Accordingly, before lubricant is introduced between the heads, the heads are coated to render them non-porous. Synthetic resin coatings may be used if they have resistance adequate to the heat to which the bearing may be subject.

The preferred procedure involves immersing each head, in turn, in a shallow bath of the coating material, the bath having just sufficient depth to coat the inner as well as the exterior faces of the respective heads as they are immersed. Either it will be necessary to plug the central opening through the spool to preclude exposure of the bearing surface to the coating liquid or it will be necessary to ream the bearing surface to remove any coating which might tend to reduce the effectiveness of the bearing surface.

In the preferred practice of the invention the spool of porous material with its ends coated is pressed into a workpiece or into an intervening sleeve. In the device selected to exemplify the invention the workpiece is a laminated motor armature and since the lubricant might escape between the laminations, a confining sleeve is fixed between the spaced heads of the bearing member and the workpiece.

In either case, the filling procedure is essentially the same. In selected exemplification, the spool with pre-coated heads is inserted into the sleeve for nearly the full depth of the spool. Just before the upper head enters the sleeve, the lubricant in liquid or semi-solid form is injected into the reservoir. This is the space between the two heads of the spool and between the hub of the spool and the confining sleeve. When the reservoir is substantially filled with lubricant the injection nozzle is withdrawn and the spool pressed home into registry with the end of the sleeve or workpiece, thus completing the bearing. The bearing assembly may then be pressed bodily into the armature or other workpiece. The reservoir thus made and filled will provide lifetime lubrication for the bearing between the spool and the shaft from which the spool supports the workpiece.

The foregoing statement assumes that the workpiece rotates on the shaft. It will be understood, however, that the reservoir may be stationary and the shaft rotatable with no change in result or method of manufacture.

In the drawings:

FIG. 1 is a view partially in side elevation and partially in axial section through a workpiece embodying the invention and comprising an armature for an electric motor of the type having a stationary shaft upon which the armature is mounted for rotation.

FIG. 2 is a view diagrammatically illustrating the procedure of coating a prefabricated porous spool of sintered material.

FIG. 3 is a fragmentary detail view in section showing on an enlarged scale one end of the coated spool which still contains a plug used to exclude the coating from the bearing surface.

FIG. 4 is a view similar to FIG. 3 showing a slightly modified procedure in which the coating has been admitted to the bearing surface.

FIG. 5 is a view in perspective showing a step in the introduction of lubricant into a reservoir provided by a spool coated in accordance with FIG. 1.

FIG. 6 is a view similar to FIG. 5 showing the completed prefabricated bearing and reservoir made according to the method shown in FIGS. 1 and 5.

The workpiece generically designated by reference character 10 in FIG. 1 comprises a motor armature mounted on a fixed shaft as shown in U.S. Patent 2,904,709. This armature comprises a number of superimposed laminations 11 of magnetic material having registering apertures. By a die casting operation performed with the apertured laminations stacked in a predetermined manner, the openings are filled with die cast metal at 12 which provide the windings of the rotor. The die cast metal extends integrally in the form of a bridge or yoke at 13 to support an output shaft 14 aligned with the bearing opening 15 in which a fixed supporting shaft 16 is received.

The bearing opening 15 is formed within a bearing and reservoir assembly generically designated by reference character 20 and separately illustrated in FIG. 6. There is an external sleeve 21 having a pressed fit within the armature rotor 10. Pressed within the sleeve is a spool 22 of porous composition such as results from prefabrication by a sintering operation. Porous bearing materials and the production thereof by sintering are well-known. In this instance, the bearing surface 23 is provided by the inner periphery of the hub portion 24. Integral with the hub portion 24 are the heads 25 and 26 which abut the inner peripheral surface of the sleeve 21 to define, therewith, an annular reservoir at 27 into which lubricant is introduced to lubricate the bearing between the hub surface 23 and the supporting shaft 16.

The lubricant may be a semi-solid grease or it may be oil. If oil is used, the spool 22 is desirably preliminarily wound with wicking 28 before the oil is introduced. If grease is used, no wicking is required.

In order to preclude leakage of the lubricant through the porous ends 25 and 26 of the spool 22, these ends are desirably coated as shown in FIGS. 2 to 4. To prevent the coating from extending undesirably onto portions of the spool which should remain porous, it is preferred to handle the coating operation by careful immersion of the ends of the spool individually in a bath of coating material.

For example, I have shown in FIG. 2 the end 26 of one of the spools 22 immersed in a bath 29 which is contained at very shallow depth in a pan 30. The depth should be barely sufficient so that the coating compound will flow over the inner face as well as the outer face of the spool head. The central bore 15 which is to receive the bearing shaft may be left open or may be plugged. In FIG. 3 I have shown a plug at 32 closing the bore. Thus the coating 33 is limited to the outer end face and to the periphery and to the inner face of the spool head 26. In FIG. 4 the coating has extended at 33' into a portion of the shaft receiving aperture 15, whereby a portion of the bearing surface 23 has been coated. Ordinarily the coating will be removed by reaming or polishing the interior of the bearing surface. If the coating is so light that it merely fills the pores, no removal operation may be required.

It is very important that the coating be applied to the inner face of the spool head. If it is possible to coat but one face of the spool head, it would be preferable to have it on the inner face rather than on the outer face. In the preferred practice as above described, the coating is applied to both faces as clearly shown in FIGS. 3 and 4.

Ordinary water glass makes an excellent coating for the purposes of the present invention. Synthetic resin of practically any type is satisfactory. Solder of sufficiently high melting point to remain effective at the temperature at which the bearing operates is also satisfactory.

When both spool heads have been coated, one end of the spool is pressed into the associated sleeve 21, if a separate sleeve is required. As has been explained above, the spool is not pressed directly into the workpiece in the present invention only because the workpiece itself comprises laminae through which the lubricant might escape, but for the intervening sleeve. If the workpiece is fluid tight the sleeve is omitted and the spool will be pressed directly into the workpiece. In such a case the workpiece itself constitutes the external sleeve.

In any event, just before the upper head 25 of the spool enters the bore into which it is being pressed, the lubricant is ejected into the reservoir space, as by means of syringe hose 35 shown in FIG. 5. When the lubricant fills the annular reservoir cavity between the hub of the spool and the surface of the bore into which the spool is being pressed (in this case the inner periphery of sleeve 21), the syringe 35 is withdrawn and the spool is pressed home to complete the assembly as shown in FIG. 6.

Assuming that the assembly includes a separate sleeve 21, as above described, the assembly is then pressed into the workpiece. Alternatively, it is possible to line the armature with the sleeve before introducing the spool and filling the reservoir.

During use the porous surface 23 of the outer bearing element is fed with lubricant from the reservoir 27 within the spool.

I claim:

1. A method of constructing a reservoir bearing, such method including the step of sintering a porous spool-shaped bearing member having heads and a central hub, sealing the pores of the heads against the escape of lubricant, pressing said member partially into a lubricant confining bore, introducing lubricant into said bore within the space between said heads and externally of said hub, and finally completing the pressing of said member into said bore whereby to seal within said bore and between said heads the lubricant so introduced.

2. A method of making a bearing having a reservoir for lubricant, said method comprising sintering a porous bearing element having a peripheral bearing surface and axially spaced radial heads, sealing the porosity of the sintered heads while leaving the pores of the bearing surface open, partially completing an enclosure of space between the heads, introducing lubricant into said partially enclosed space, and completing the enclosure of said space to constitute a lubricant reservoir, the lubricant being flowable through the pores to lubricate the bearing surface.

3. The method set forth in claim 2 in combination with the further step of inserting wicking in the space between said heads and introducing the lubricant in a form sufficiently liquid to be absorbed in said wicking.

4. A method of making a bearing having a reservoir for lubricant, said method comprising the steps of prefabricating a non-porous sleeve, prefabricating a sintered spool of porous bearing material having heads so spaced as to be engageable with said sleeve and having a hub portion of materially smaller radius than the interior of the sleeve and having its inner periphery constituting a bearing surface, coating the heads of said spool exclusively of the hub portion thereof with a material impervious to lubricant, inserting one of the head portions of the spool into said sleeve and advancing the spool through said sleeve until the other head portion of the spool approaches the sleeve, introducing lubricant into the space within the spool and between the hub portion thereof and the sleeve, and thereupon further advancing the spool into the sleeve until the remaining head portion of the spool is in sealing engagement with the sleeve to confine the lubricant, the pores of the hub portion remaining open sufficiently to permit lubricant flow to the bearing surface within the hub portion.

5. The method recited in claim 4 in further combination with the step of winding wicking about the hub portion of the spool prior to the introduction of lubricant, and thereupon introducing said lubricant in a form sufficiently liquid to be absorbed by said wicking.

References Cited in the file of this patent

UNITED STATES PATENTS

| | | |
|---|---|---|
| 2,093,800 | May | Sept. 21, 1937 |
| 2,228,406 | Schmidt | Jan. 14, 1941 |
| 2,966,459 | Abel | Dec. 27, 1960 |

FOREIGN PATENTS

| | | |
|---|---|---|
| 848,499 | France | July 24, 1939 |